United States Patent
Hall et al.

(10) Patent No.: US 7,907,725 B2
(45) Date of Patent: *Mar. 15, 2011

(54) SIMPLE UNIVERSAL HASH FOR PLAINTEXT AWARE ENCRYPTION

(75) Inventors: William Eric Hall, Clinton, CT (US); Charanjit Singh Jutla, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 462 days.

This patent is subject to a terminal disclaimer.

(21) Appl. No.: 12/129,092

(22) Filed: May 29, 2008

(65) Prior Publication Data

US 2008/0226063 A1  Sep. 18, 2008

Related U.S. Application Data

(63) Continuation of application No. 11/843,783, filed on Aug. 23, 2007, now Pat. No. 7,860,241, which is a continuation of application No. 10/694,610, filed on Oct. 27, 2003, now Pat. No. 7,321,659.

(60) Provisional application No. 60/508,015, filed on Oct. 1, 2003.

(51) Int. Cl.
 *H04L 9/00* (2006.01)
 *G06F 7/04* (2006.01)
(52) U.S. Cl. ........... 380/28; 713/168; 713/169; 713/170; 713/171; 726/27; 726/28; 726/29; 726/30
(58) Field of Classification Search ................ 380/28
 See application file for complete search history.

(56) References Cited

U.S. PATENT DOCUMENTS

| 2004/0017913 A1* | 1/2004 | Hawkes et al. ............. 380/37 |
| 2005/0074116 A1* | 4/2005 | Hall et al. .................. 380/37 |

* cited by examiner

*Primary Examiner* — Longbit Chai
(74) *Attorney, Agent, or Firm* — F. Chau & Associates, LLC

(57) ABSTRACT

A simple universal hash apparatus and method include input means for inputting at least one of a plurality of Plaintext blocks into an integrity aware encryption scheme using at least one of two secret keys to obtain a plurality of Ciphertext blocks; Plaintext checksum means for computing a Plaintext checksum value from said plurality of Plaintext blocks; Ciphertext checksum means for processing said plurality of Ciphertext blocks and a third key to obtain a Ciphertext checksum; and combination means for combining said Plaintext checksum and said Ciphertext checksum to obtain the simple universal hash value.

24 Claims, 4 Drawing Sheets

SIMPLE UNIVERSAL HASH FOR PLAINTEXT AWARE ENCRYPTION

CROSS-REFERENCE TO RELATED APPLICATION

This is a continuation application of U.S. application Ser. No. 11/843,783, filed on Aug. 23, 2007, U.S. Pat. No. 7,860, 241, the disclosure of which is incorporated by reference herein in its entirety, which, in turn, is a continuation application of U.S. application Ser. No. 10/694,610, filed on Oct. 27, 2003, and now issued as U.S. Pat. No. 7,321,659, the disclosure of which is incorporated by reference herein in its entirety, and claims the benefit of U.S. Provisional Application Ser. No. 60/508,015, filed Oct. 1, 2003, and entitled "SIMPLE UNIVERSAL HASH FOR PLAINTEXT AWARE ENCRYPTION", which is incorporated herein by reference in its entirety.

BACKGROUND OF THE INVENTION

The present invention relates generally to hashing algorithms, and in particular, to universal hashing algorithms for Plaintext aware encryption.

Cryptographic systems are known in the data processing art. In general, these systems operate by performing an encryption operation on a Plaintext input message by using an encryption key and a symmetric key block cipher, and producing a Ciphertext message. The encrypted message may then be stored on an insecure device. The stored message may be decrypted with the corresponding decryption operation using the same key, to recover the Plaintext message. Since the same key is used for both the Encryption and decryption of the message, the process is referred to as a "symmetric key" process.

Although the above encryption hides the Plaintext from an adversary, one may want to store data in an insecure and/or unreliable device and later check to determine if the data was not deliberately or accidentally modified. To this end, a universal hash of the data is computed. Since the hash is a comparatively small piece of data relative to the data stored, the user will store the data and save the hash in a secure location to prevent stored data modification. When retrieving the data at a later time, the user would regenerate the hash on the retrieved data, and compare it with the original hash for authenticity. Here, "universal hash" refers to the fact that the hash is key dependent, with the further property that the probability is extremely small that two messages, whether random or generated by someone who is not privy to the key of the hash, will hash to the same value.

If a Ciphertext consists of several blocks, a universal hash is usually constructed by a chaining mechanism, which is inherently sequential. There are alternative methods such as a universal message authentication code ("UMAC"), which, however, require a large amount of key material.

Accordingly, what is needed is a universal hash for Plaintext-aware encryption that has low-complexity and does not require a large amount of key material.

SUMMARY OF THE INVENTION

The above and other drawbacks and deficiencies of the prior art are overcome or alleviated by a simplified universal hash for Plaintext-aware encryption.

A simple universal hash apparatus and method include input means for inputting at least one of a plurality of Plaintext blocks into an integrity aware encryption scheme using at least one of two secret keys to obtain a plurality of Ciphertext blocks; Plaintext checksum means for computing a Plaintext checksum value from said plurality of Plaintext blocks; Ciphertext checksum means for processing said plurality of Ciphertext blocks and a third key to obtain a Ciphertext checksum; and combination means for combining said Plaintext checksum and said Ciphertext checksum to obtain the simple universal hash value.

These and other aspects, features and advantages of the present disclosure will become apparent from the following description of exemplary embodiments, which is to be read in connection with the accompanying drawings.

BRIEF DESCRIPTION OF THE DRAWINGS

The present invention may be better understood with reference to the following exemplary figures, in which.

DETAILED DESCRIPTION OF PREFERRED EMBODIMENTS

The present disclosure relates to a method and apparatus for generating a simple universal hash value of Ciphertexts produced using an integrity aware encryption scheme. Method embodiments provide for generating a cryptographic authentication code in a simple manner for Ciphertexts, which have been generated by a Plaintext aware encryption scheme or encryption schemes with built in checks, or, in general, any multi block encryption scheme where block number sensitivity is built into the Ciphertext.

Exemplary embodiments of the present disclosure are described and attained with encryption and/or decryption methods of block ciphers, including embodiments realizable using a program of instructions executable by a machine to perform method steps according to the present disclosure.

An embodiment of the present disclosure defines a new class of universal hash functions computed on a sequence of Ciphertext blocks in contexts where the blocks were computed by an encryption scheme, which created Ciphertext blocks by first whitening the Plaintext blocks with material generated from a first secret key and then encrypting it using a block cipher or other cryptographic primitive using the first or a second encryption key, and whitening the output of the block cipher with material generated from the first key. For future reference, such Ciphertexts will be called Plaintext aware Ciphertexts. Sometimes, such schemes are also called integrity aware encryption schemes.

Another embodiment of the present disclosure defines smaller sized universal hash function values, which can be used in situations where the allowed probability of two hash functions being the same is larger. An additional embodiment of the present invention provides a method for generation of such universal hash functions, as well as an apparatus that generates such universal hash functions.

A method according to an embodiment of the present disclosure, for implementing a universal hash function on Plaintext aware Ciphertexts, is also provided. The method includes the steps of independently generating a value from each Ciphertext block and the hash key, and then computing the exclusive-or of all the values, along with a checksum computed from the Plaintext blocks, to generate the universal hash function value.

Figure 1:
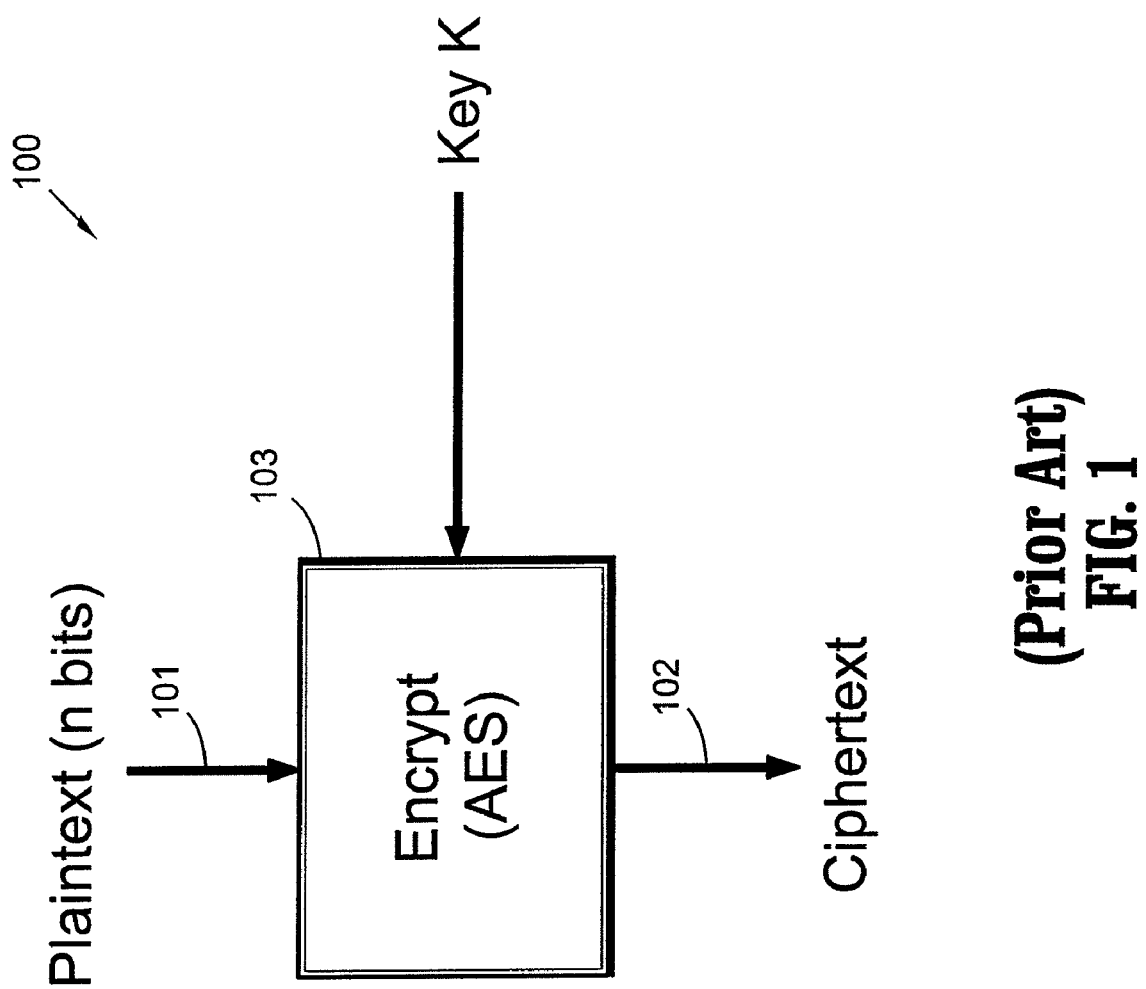
FIG. 1 shows a block diagram of a conventional block encryption cryptographic method that operates on a Plaintext message.

As shown in FIG. 1, a conventional block-encryption cryptographic system is indicated generally by the reference numeral 100. Here, a block of Plaintext data 101 is received by a block cipher algorithm 103, such as, for example, an algorithm complying with the Digital Encryption Standard ("DES") or Advanced Encryption Standard ("AES"). The encryption algorithm 103 is used to encrypt one block of Plaintext 101 to generate one block of Ciphertext 102. The block size is fixed at 64 bits or 128 bits in DES or AES, respectively. The block cipher uses a secret key K. The secret key K is shared between the encrypting and decrypting users. To recreate the original Plaintext block, the decrypting user uses the same key and the same block cipher to decrypt the Ciphertext 102 that was used to encrypt the original Plaintext block 101.

Figure 2:
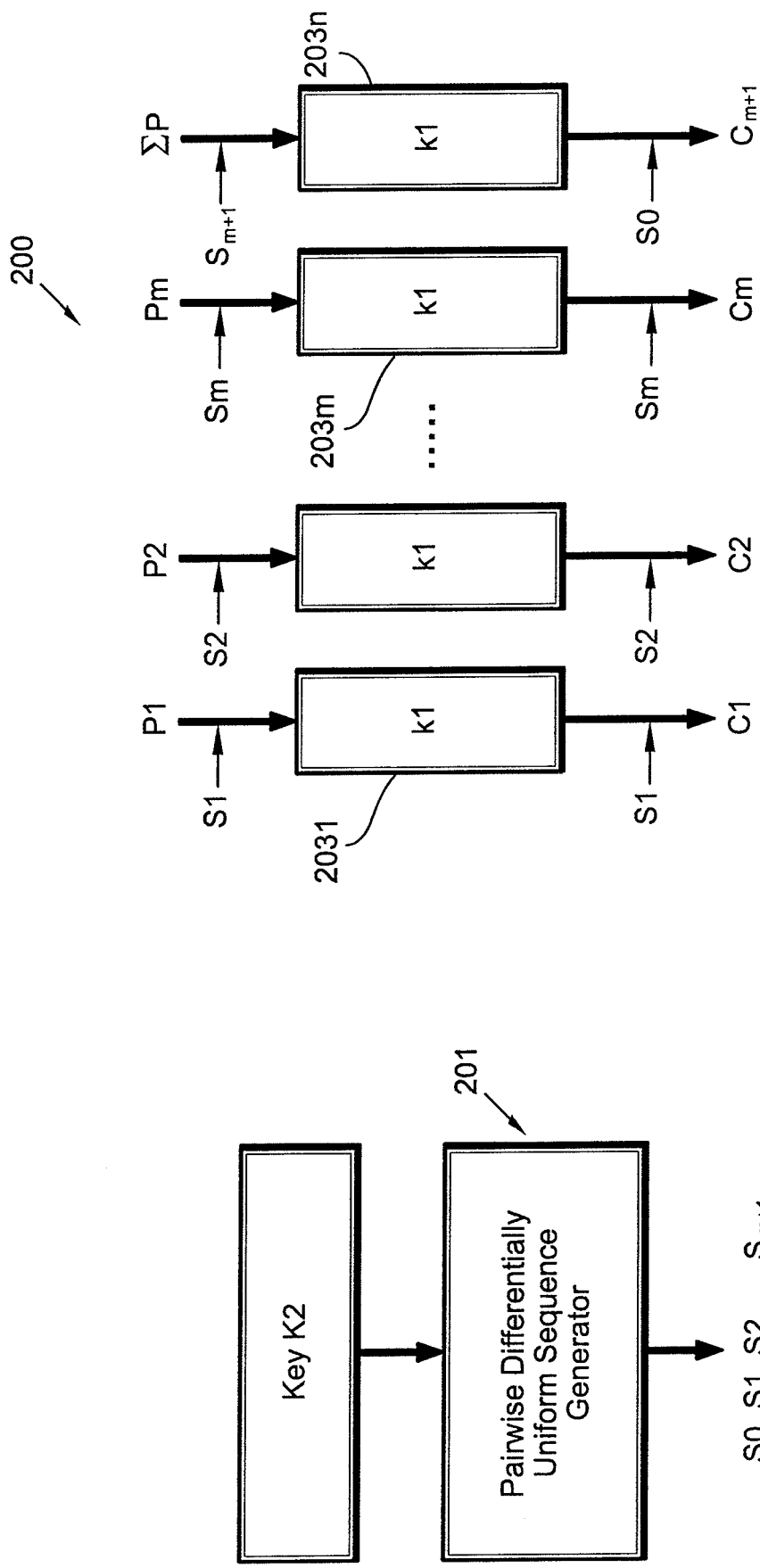
FIG. 2 shows a block diagram of a conventional integrity-aware encryption scheme.

Turning to FIG. 2, a conventional Integrity Aware Encryption scheme using an Integrity Aware Parallelizable Mode ("IAPM") is indicated generally by the reference numeral 200. In IAPM, each Plaintext block P1, P2 to Pm is encrypted using a block cipher, such as the block ciphers 2031 through 203n, with a key k1, but only after first being subjected to an exclusive-or operation with S1, S2 to Sm respectively.

The output of the block cipher is then exclusive-or'ed with S1, S2 to Sm, respectively, to produce Ciphertext blocks C1, C2 to Cm. The integrity of the Ciphertext is assured by generating another Ciphertext block Cm+1. This block is generated by first taking the checksum of the Plaintexts, which, in one embodiment, is obtained by taking the exclusive-or of all the Plaintext blocks P1, P2 to Pm. The checksum block is then exclusive-or'ed with Sm+1 and then encrypted with the block cipher 103, and the output of the block cipher exclusive-or'ed with S0 to produce Cm+1. The sequence S0,S1, to Sm+1 is called in the art a pairwise differentially uniform sequence or xor-universal sequence. It is generated by a function block 201 from a second key K2, by multiplying K2 with index i in a Galois field, or by other such operations as understood in the art.

Figure 3:
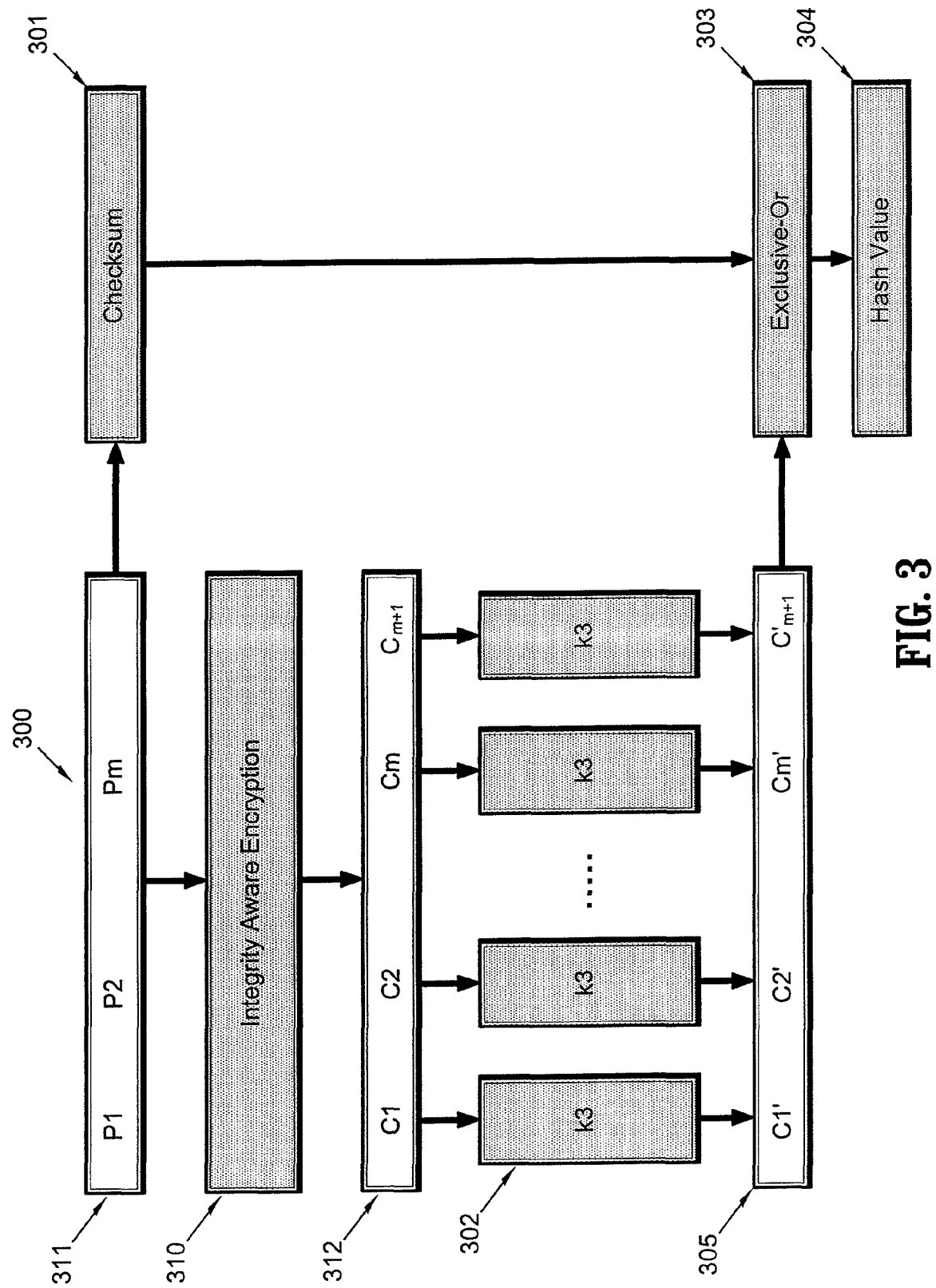
FIG. 3 shows a block diagram defining the Simple Universal Hash Function in accordance with a preferred embodiment of the present disclosure.

As shown in FIG. 3, a simple universal hash function according to a preferred embodiment of the present disclosure is indicated generally by the reference numeral 300. Here, a Plaintext group of blocks 311 is passed to an integrity-aware encryption unit 310, as well as to a checksum generator 301. A Ciphertext group of blocks 312 is produced by the encryption block 310, including an mth Ciphertext block Cm. The values of the Ciphertext blocks, C1 through C1 and Cm+1, are each passed to a corresponding k3 hash key of the keys 302, with the mth Ciphertext block Cm going to an mth k3 hash key. A hashed Ciphertext group of blocks 305 is output from the hash keys, and includes hashed Ciphertext values C1' through Cm' and C'm+1. The hashed Ciphertext group of blocks 305 is passed to an Exclusive-Or block 303, which Exclusive-Or's the hashed Ciphertext with the checksum produced by the checksum generator 301. The output of the Exclusive-Or block is the hash value 304.

Thus, the simple universal hash function 300 is a function of the Plaintext blocks as well as the Ciphertext blocks, and the hash key k3. The final hash value 304 is not necessarily the size of one block of the block cipher, but may be smaller, in general. As an example, if the block cipher block size is 128 bits, as in AES, and if the hash value is only supposed to be 16 bits, then the hash key k3 will be of size 48 bits (48=128/8*log 8). In general, the key size K3 will be 128/t*log t, where 128/t is the size of the hash value 304. In case the hash value is only 16 bits, a checksum 301 of 16 bits is computed from the Plaintext blocks P1, P2 to Pm.

In one embodiment, the checksum can be computed by taking the exclusive-or of all of the Plaintext blocks, and then taking the exclusive-or of the eight 16-bit segments in the resulting 128-bit block. The Ciphertext blocks C1 to Cm+1 produced by any Plaintext aware encryption scheme, such as, for example, the IAPM 200 of FIG. 2, are then individually processed by the keyed selector 302 to obtain 16-bit values C1', C2' to C'm+1 respectively using the hash key k3 as in FIG. 4, to follow. The 16-bit quantities C1', C2' to C'm+1 are exclusive-or'ed with each other and the 16-bit checksum 301 to obtain the hash value 304. In other words, the hash value 304, which is itself 16-bits long, is obtained by taking the exclusive-or sum of C1', C2' to C'm+1 and the checksum 301.

It shall be understood by those of ordinary skill in the pertinent art that embodiments of the present disclosure may be realized with the above-described IAPM scheme, or with any scheme of encrypting several Plaintext blocks, as long as a block number sensitivity is built in to the Ciphertexts. The block number sensitivity may be built in to the Ciphertexts using a sequence such as S1, S2 to Sm+1, which is pairwise differentially uniform or pairwise independent.

Figure 4:
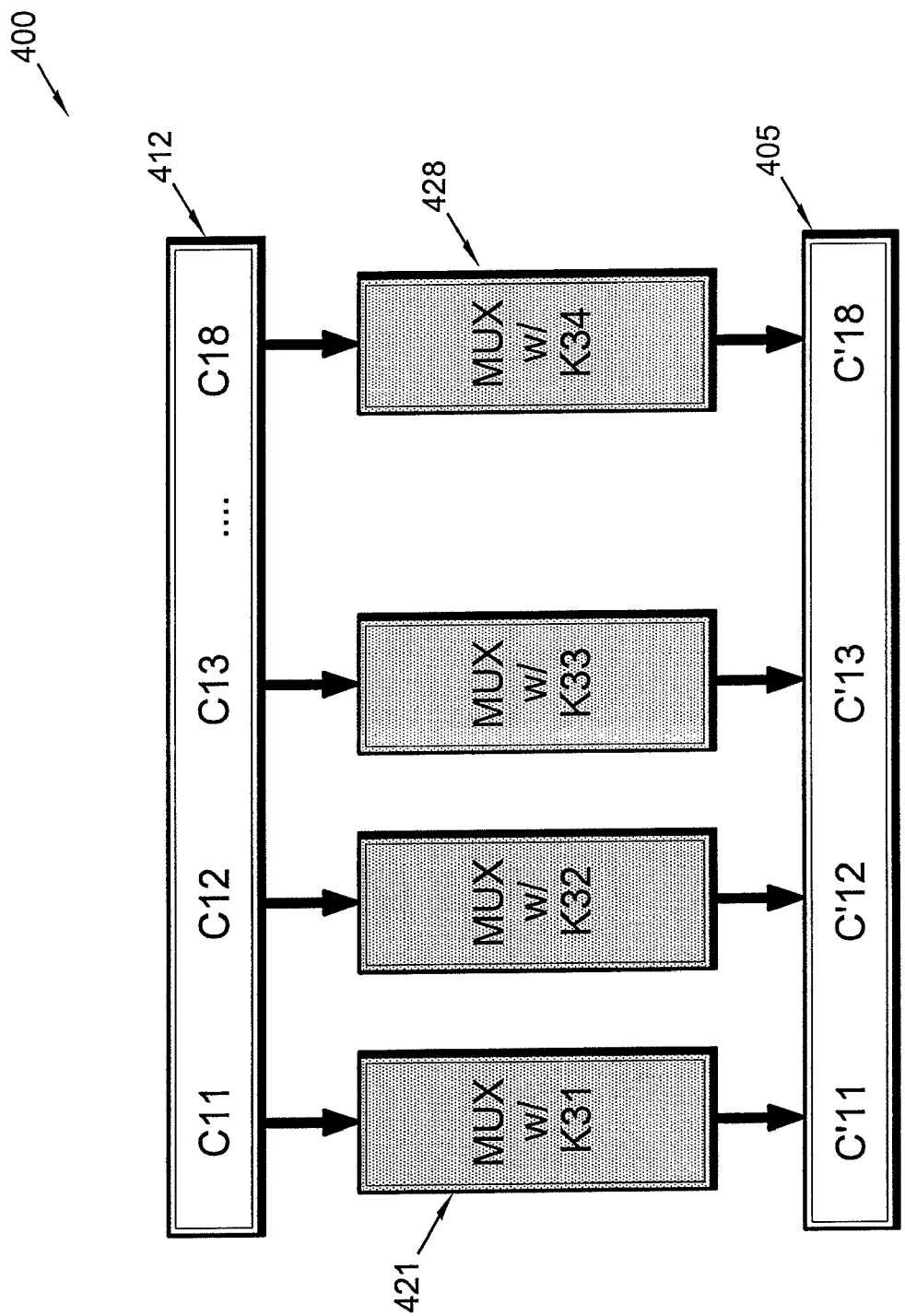
FIG. 4 shows a block diagram of the Keyed Selector using key k3 in accordance with the embodiment of FIG. 3.

Turning now to FIG. 4, the keyed selector 302 of FIG. 3, which uses the key k3, is indicated generally by the reference numeral 400. Here, values of the Ciphertext block 412 are each received by a multiplexer ("MUX") 421 through 428, respectively, using a key. For example, the Ciphertext value c1_1 is passed to a MUX using the key K3_1, the Ciphertext value c1_2 is passed to a MUX using the key K3_2, the Ciphertext value c1_3 is passed to a MUX using the key K3_3, and the Ciphertext value c1_8 is passed to a MUX using the key K3_4, as indicated by the reference numeral 428, for example. The hashed Ciphertext values are output by each respective MUX to form the hashed Ciphertext block 405, comprising hashed Ciphertext bit values C'1_1, C'1_2, C'1_3 through C'1_8, respectively.

In one embodiment, the key K3 is 128/t*log t bits, where 128/t is the size of the final hash value 304 of FIG. 3. For example, when t=8, the key K3 is 48 bits. The Ciphertext block 312 of FIG. 3 is divided into 16 8-bit values C1_1, C1_2, and C1_3 to C1_16. The first 3 bits of the key K3 are used to select a single bit C'1_1 from C1_1. The 3 bits serve as an index into the byte C1_1. The next three bits of K3 are used to select one bit C'1_2 from the next byte C1__2, and so on. The last three bits of K3, that is the least significant bits, are used to select a bit C'1_16 from byte C1_16. The concatenation 305 of the 16 bits C'1_1. C'1_2, to C'1_16 constitutes the 16 bit value C'1.

The values C2', C3' . . . C'm+1 of 305 are similarly computed using the same key K3 and the keyed selector 302. Various other keyed selectors may be used, as long as it produces a 128/t bit value 305 using the key K3 from 128-bit Ciphertext block 102. In particular, universal hash functions known in prior art maybe used as keyed selectors.

In another embodiment the last block Cm+1 is not used in computing the final hash value 304. In other words, the exclusive-or sum 303 is performed only on the checksum 301 and the 16 bit values C1', C2' to C'm.

Although illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. A method for generating a simple universal hash value, the method comprising:
   configuring at least one processor to perform the steps of functions:
   inputting at least one of a plurality of Plaintext blocks into an integrity aware encryption scheme using at least one of two secret keys to obtain a plurality of Ciphertext blocks;
   computing a Plaintext checksum value from the plurality of Plaintext blocks;
   dividing at least one of the plurality of Ciphertext blocks into a plurality of equal sized segments;
   assigning each one of a plurality of bits from a third key to each of the plurality of segments, respectively;
   selecting a single bit from an assigned segment in correspondence with the plurality of bits of the third key;
   concatenating a plurality of single bits selected from each of the segments to obtain a partial Ciphertext;
   combining partial Ciphertexts to obtain a Ciphertext checksum; and combining the Plaintext checksum and the Ciphertext checksum to obtain the simple universal hash value.

2. The method as defined in claim 1 wherein the Plaintext checksum, the Ciphertext checksum and the universal hash value are all of the same size.

3. The method as defined in claim 1 wherein the size of the first of the plurality of Plaintext blocks is a multiple of the size of the universal hash value.

4. The method as defined in claim 1, further comprising computing a partial sum by taking the exclusive-or sum of the plurality of Plaintext blocks and reducing the partial sum to obtain the Plaintext checksum.

5. The method as defined in claim 4 wherein reducing the partial sum comprises computation of the exclusive-or sum of equal sized segments of the partial sum.

6. The method as defined in claim 1, further comprising:
   reducing the plurality of Plaintext blocks to obtain a plurality of partial Plaintext blocks; and
   combining the plurality of partial Plaintext blocks using an exclusive-or sum to obtain the Plaintext checksum.

7. The method as defined in claim 6 wherein reducing the plurality of Plaintext blocks comprises the computation of the exclusive-or sum of equal sized segments of the Plaintext blocks.

8. The method as defined in claim 1 wherein obtaining the Ciphertext checksum comprises:
   selecting partial Ciphertexts using the third key from each of the plurality of Ciphertext blocks; and
   combining the partial Ciphertexts using an exclusive-or sum to obtain the Ciphertext checksum.

9. The method as defined in claim 8 wherein selecting partial Ciphertexts using the third key from a Ciphertext block comprises the process of using the bits of the third key as an index into the Ciphertext block.

10. The method as defined in claim 1 wherein the partial Ciphertexts are combined using an exclusive-or sum.

11. The method as defined in claim 1 wherein the Plaintext checksum and the Ciphertext checksum are combined by an exclusive-or operation to obtain the universal hash value.

12. The method as defined in claim 1 wherein obtaining the Ciphertext checksum comprises:
   obtaining partial checksums using known universal hash functions from the third key and each of the plurality of Ciphertext blocks; and
   combining the partial checksums using an exclusive-or sum to obtain the Ciphertext checksum.

13. A simple universal hashing apparatus comprising:
   input means for inputting at least one of a plurality of Plaintext blocks into an integrity aware encryption scheme using at least one of two secret keys to obtain a plurality of Ciphertext blocks;
   Plaintext checksum means for computing a Plaintext checksum value from said plurality of Plaintext blocks;
   Ciphertext checksum means for processing said plurality of Ciphertext blocks and a third key to obtain a Ciphertext checksum; and
   combination means for combining said Plaintext checksum and said Ciphertext checksum to obtain the simple universal hash value,
   wherein:
   at least one of said plurality of Ciphertext blocks is divided into a plurality of equal sized segments;
   each one of a plurality of bits of a third key is assigned to each of the plurality of segments, respectively;
   the plurality of bits of the third key are used to select a single bit from the assigned segment;
   a plurality of single bits selected from each of the segments is concatenated to obtain a partial Ciphertext; and
   partial Ciphertexts are combined to obtain the Ciphertext checksum.

14. The apparatus as defined in claim 13 wherein the Plaintext checksum, the Ciphertext checksum and the universal hash value are each of the same size.

15. The apparatus as defined in claim 13 wherein the size of the first of the plurality of Plaintext blocks is a multiple of the size of the universal hash value.

16. The apparatus as defined in claim 13, further comprising Plaintext checksum means for computing a partial sum by taking the exclusive-or sum of the plurality of Plaintext blocks and reducing the partial sum to obtain the Plaintext checksum.

17. The apparatus as defined in claim 16 wherein the Plaintext checksum means reduces the partial sum by computation of the exclusive-or sum of equal sized segments of the partial sum.

18. The apparatus as defined in claim 13 wherein the plurality of Plaintext blocks is reduced to obtain a plurality of partial Plaintext blocks, which, in turn, are combined using an exclusive-or sum to obtain the Plaintext checksum.

19. The apparatus as defined in claim 18 wherein the plurality of Plaintext blocks is reduced by computation of the exclusive-or sum of equal sized segments of the Plaintext blocks.

20. The apparatus as defined in claim 13, further comprising means for obtaining the Ciphertext checksum by selecting partial Ciphertexts using the third key from each of the plurality of Ciphertext blocks, and combining the partial Ciphertexts using an exclusive-or sum to obtain the Ciphertext checksum.

21. The apparatus as defined in claim 20 wherein the selection of a partial Ciphertext using the third key from a Ciphertext block includes using the bits of the third key as an index into the Ciphertext block.

22. The apparatus as defined in claim 13 wherein the partial Ciphertexts are combined using an exclusive-or sum.

23. The apparatus as defined in claim 13, further comprising an exclusive-or unit for combining the Plaintext checksum and the Ciphertext checksum to obtain the universal hash value.

24. A non-transitory program storage memory readable by machine, tangibly embodying a program of instructions executable by the machine to perform program steps for generating a simple universal hash value, the program steps comprising:

inputting a plurality of Plaintext blocks into an integrity aware encryption scheme using at least one of two secret keys to obtain a corresponding plurality of Ciphertext blocks;

computing a Plaintext checksum value responsive to each of said plurality of Plaintext blocks;

dividing at least one of the plurality of Ciphertext blocks into a plurality of equal sized segments;

assigning each one of a plurality of bits from a third key to each of the plurality of segments, respectively;

selecting a single bit from an assigned segment in correspondence with the plurality of bits of the third key; and concatenating a plurality of single bits selected from each of the segments to obtain a partial Ciphertext;

combining partial Ciphertexts using an exclusive-or sum to obtain a Ciphertext checksum; and combining said Plaintext checksum and said Ciphertext checksum to obtain the simple universal hash value.

* * * * *